(12) United States Patent
Thirumalai et al.

(10) Patent No.: US 8,108,262 B1
(45) Date of Patent: Jan. 31, 2012

(54) HAGGLING IN AN ELECTRONIC COMMERCE SYSTEM

(75) Inventors: Srikanth Thirumalai, Clyde Hill, WA (US); B. Anthony Joseph, Bellevue, WA (US); Matthew K. Green, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 953 days.

(21) Appl. No.: 12/039,784

(22) Filed: Feb. 29, 2008

(51) Int. Cl.
*G06Q 30/00* (2006.01)
(52) U.S. Cl. .................................................. 705/26.1
(58) Field of Classification Search ................. 705/26.1
See application file for complete search history.

(56) References Cited

U.S. PATENT DOCUMENTS

| | | | |
|---|---|---|---|
| 6,058,379 | A | 5/2000 | Odom et al. |
| 7,062,460 | B1 | 6/2006 | Growney et al. |
| 2006/0111986 | A1* | 5/2006 | Yorke et al. .................. 705/26 |

OTHER PUBLICATIONS

Scott McCartney; Wall Street Journal. (Eastern edition). New York, N.Y.: Jul. 11, 2006. p. D.1 http://proquest.umi.com/pqdweb?did=1074885281&sid=11&Fmt=3&clientId=19649&RQT=309&VName=PQD.*

* cited by examiner

*Primary Examiner* — Mila Airapetian
(74) *Attorney, Agent, or Firm* — Thomas, Kayden, Horstemeyer & Risley, LLP

(57) ABSTRACT

Disclosed are various embodiments of systems, methods, and computer programs that facilitate haggling in an electronic commerce system. An average spread of a user is calculated, which is the average difference between an initial list price and a final transaction price among transactions in a transaction history. A rounds score is also calculated, which is based on the number of counteroffers extended by a user in the transaction history. A volume score is calculated and based on the volume of transactions a user has consummated in the transaction history. An abandonment score is calculated and based on the percentage of transactions the user has abandoned. A haggling rating is calculated and based on a combination of the average spread, the rounds score, the volume score, and the abandonment score, and represents an effectiveness of the user in haggling and completing transactions with other users.

16 Claims, 10 Drawing Sheets

| Product Search Results For: | widgets | | | |
|---|---|---|---|---|
| Showing 1-7 of 14,554 | | | | |
| Product | Buy New: | | Used and New From: | |
| Brown Widgets | Buy New: | $89.99 | Used and New From: | $89.99 ✱ |
| Blue Widgets | Buy New: | $34.99 | Used and New From: | $34.99 |
| Green Widgets | Buy New: | $69.99 | Used and New From: | $69.99 |
| Yellow Widgets | Buy New: | $129.99 | Used and New From: | $129.99 ✱ |
| Double Widget | Buy New: | $2449.99 | Used and New From: | $999.49 ✱ |
| Economy Widget | Buy New: | $19.99 | Used and New From: | $19.99 |
| Premium Widget | Buy New: | $249.99 | Used and New From: | $249.99 |

✱ Price may be Haggled

FIG. 2

110a

| Haggling Administration | | | | Widget Mall |
|---|---|---|---|---|
| Showing 1-7 of 150 | | | | |
| Product | Pending Offers | Asking Price | Average Offer Price | Stock |
| Brown Widgets | 21 | $89.99 | $82.00 | 45 |
| Blue Widgets | 1 | $34.99 | $30.00 | 90 |
| Green Widgets | 18 | $69.99 | $61.00 | 243 |
| Yellow Widgets | 95 | $129.99 | $124.99 | 11 |
| Double Widget | 51 | $999.49 | $950.00 | 59 |
| Economy Widget | 27 | $19.99 | $17.99 | 32 |
| Premium Widget | 5 | $249.99 | $230.00 | 12 |

110e

HAGGLING IN AN ELECTRONIC COMMERCE SYSTEM

BACKGROUND

Buyers and sellers in a retail setting often engage in fixed price and fixed terms transactions in an electronic commerce system. Existing user rating systems in electronic commerce systems can rate the reputation of a user within the system according to feedback from other users.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIG. 2 is a drawing of an example of a user interface that is generated on a client in the network of FIG. 1 that describes products sought by a user in an electronic commerce system according to an embodiment of the present disclosure;

DETAILED DESCRIPTION

Figure 1:
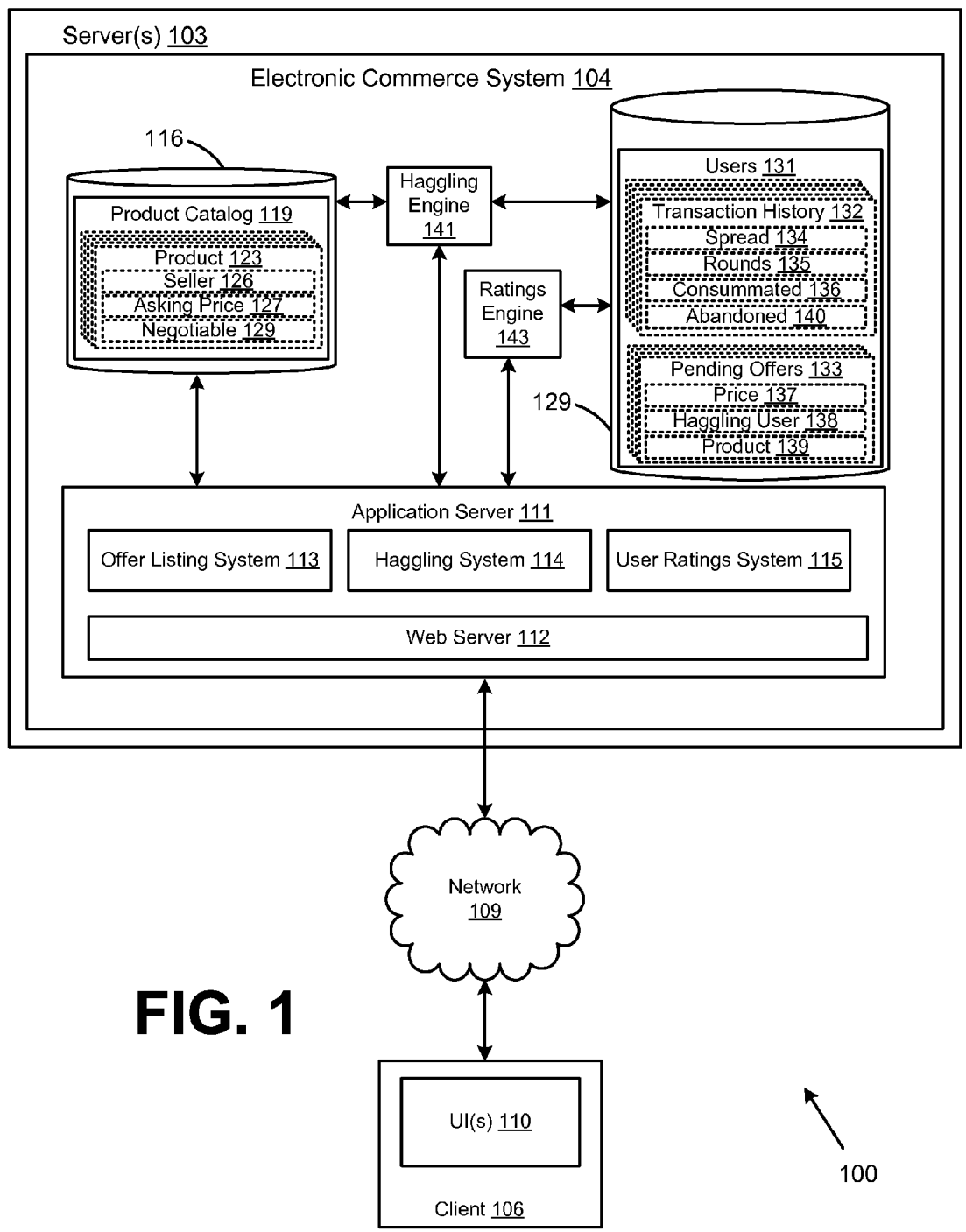
FIG. 1 is a drawing of a network having a plurality of clients and an exemplary server that facilitates brokering and haggling between users in an electronic commerce system according to an embodiment of the present disclosure.

With reference to FIG. 1, shown is a networked environment 100 for providing for haggling or negotiation between users that includes, for example, at least one server 103 implementing an electronic commerce system 104 and at least one client 106. The server 103 may represent multiple servers that may be arranged to work in coordination with each other. Alternatively, such servers may be arranged in some other manner, as can be appreciated. The client 106 is representative of multiple clients 106 that are configured to access information on the server 103. Both the server 103 and the client 106 are coupled to a network 109. The network 109 may include, for example, any type of network environment such as the Internet, intranets, local area networks, wide area networks (WANs), wireless networks, cellular networks, phone networks, or other suitable networks as can be appreciated or any combination of two or more such networks.

According to various embodiments, the server 103 includes various applications that are executed, for example, to effect order fulfillment for a seller in an electronic commerce system 104. To this end, an application server 111 is executed in the server(s) 103, which may in turn execute other systems for interacting with a client 106 via the network 109. Systems running in an application server 111 in an electronic commerce system 104 may include but are not limited to order fulfillment systems, dynamic network or web page servers, inventory systems, or other systems as can be appreciated. However, such systems are not described herein in detail.

Various user interfaces 110 are generated on a display device of the client 106 to facilitate interaction with the various systems or components implemented on the server 103 and within the application server 111. In this way, buyers and sellers within the electronic commerce system 104 may interact with the various systems on the server 103 to haggle or negotiate the price or other terms of a transaction. The client 106 is configured to interface with the various systems on the server 103 in order to effect the viewing of products, product offers from sellers, haggling ratings of other users as well, as to effectuate the haggling process for the purchase of products within the electronic commerce system 104. With respect to the various embodiments, the client 106 interfaces with the application server 111 and its various applications via the web server 112. The client 106 interfaces with an offer listing system 113 in order to view products as well as the various sellers that are offering a desired product and the product offers extended by the various sellers. The client 106 also interfaces with a haggling system 114 in order to facilitate haggling or negotiating with other users in the electronic commerce system 104. Further, the client 106 interfaces with the user ratings system 115 in order to generate and view haggling ratings associated with other users in the electronic commerce system 104.

The server 103 includes a product data store 116 that includes a product catalog 119. The product catalog 119 is made up of a listing of various products 123. Each product 123 can be offered for sale by at least one seller 126 within the electronic commerce system 104 as can be appreciated. In addition, a seller 126 offering a product 123 for sale may also include an asking price 127 and a negotiable flag 129 indicating whether the price or terms under which the product 123 is sold are negotiable. In other words, data associated with a product that is negotiable indicates whether the price or other terms may be haggled or negotiated with a seller 126. According to various embodiments, also associated with each product 123 in the product catalog 119 is detailed information (not shown) about the product that is available to a potential buyer or that is to be released to customers in the future who may wish to purchase the product 123. It should be appreciated that the above structure of the product data store 116 is but one example and that various alternative structures or hierarchies can be used to store and manipulate the same or similar information pertaining to products in an electronic commerce system 104. Further, it should also be appreciated that additional or alternative information may be stored within the product data store 116 in accordance with various embodiments of the disclosure.

The server 103 also includes a user data store 129 that includes certain data about the various users 131 of the electronic commerce system 104. Data regarding users 131 includes information employed to facilitate haggling between various users 131 within the electronic commerce system 104 according to an embodiment of the disclosure. Data regarding users 131 include a transaction history 132 and pending offers 133 extended by a user attempting to haggle or negotiate a purchase or sale within the electronic commerce system 104. The transaction history 132 stores information relating to each of the previous transactions conducted by a user within the electronic commerce system 104, whether the user is a buyer or a seller and whether the previous transactions were consummated.

The transaction history 132 includes metrics used in the calculation of a haggling rating associated with a user. The haggling rating indicates the amenability, reputation, or effectiveness of a user to negotiate or haggle within the electronic commerce system 104. Each transaction within the transaction history 132 of a given user contains a record of the spread 134 associated therewith. The spread 134 is the difference between the initial offering price of the transaction, whether the user is a buyer or seller, and the final or settlement price of the transaction. A transaction record within the transaction history 132 further includes the number of rounds 135 required to complete a particular transaction, which can be expressed as the number of counteroffers extended or the number of offers rejected by the user in the haggling process. A transaction record within the transaction history 132 further includes a flag or record indicating whether a user consummated 136 the transaction for a product for which the user has haggled or negotiated in the electronic commerce system 104.

Data regarding users 131 can also include information about pending offers 133 extended by a user for products for which the user is haggling or negotiating in the electronic commerce system 104. The pending offers 133 include information regarding price 137, which includes the prices offered by the user as well as the prices offered by the seller/buyer with which the user is haggling. The pending offers 133 further include information regarding the identity of the person or entity with which a user is haggling, or a haggling user 138. The pending offers 133 also include the product 139 for which the user desires to haggle or negotiate settlement terms.

As noted above, it should be appreciated that the above data store structure is but one example of a structure for storing the above noted information and that various alternative structures or hierarchies can be utilized to store and manipulate the same or similar information pertaining to users in an electronic commerce system 104. Further, it should also be appreciated that additional or alternative information may be stored within a data store in accordance with an embodiment of the disclosure.

To effectuate haggling or negotiation between users within the electronic commerce system 104 in accordance with an embodiment of the disclosure, the application server 111 may execute the offer listing system 113, the haggling system 114, and the user ratings system 115. The application server 111 may also communicate with or execute a haggling engine 141 and a ratings engine 143.

The offer listing system 113 provides for generating and displaying product listings and an offer listing page(s) to a user in a user interface 110 via the network 109 and client 106.

An offer listing page can include offers for a particular product sold by various sellers in various conditions and for various prices. For example, users communicating via a client 106 with the application server 111 via the web server 112 may manipulate a user interface 110 to cause the offer listing system 113 to search for a desired product(s) retrieved from the product catalog 119 and return an offer listing page. In addition, a user may view an offer listing page which displays the various sellers offering a desired product as well as their respective asking prices and whether the price or other terms of the product are negotiable. The offer listing system 113 may also list other attributes of the product, which can include but are not limited to whether the product is used or new and the identity of the seller 126.

The application server 111 may additionally execute a haggling system 114 which generates user interface elements and operates in conjunction with the haggling engine 141 to allow a user to haggle or negotiate the price of a product in the electronic commerce system 104. The haggling system 114 and haggling engine 141 broker interactions between users in the electronic commerce system 104. For example, a seller may indicate that a price or other terms associated with an offered product in the product catalog 119 is negotiable 129. A buyer desiring the product may, by manipulating the user interface 110, cause the haggling system 114 to submit an offer to purchase the product 123 from a seller 126 at a price below the asking price 127. The seller 126, by manipulating a user interface 110, may subsequently submit a counteroffer via the haggling engine 141 and haggling system 114 to the buyer. In this manner, users may continue to haggle via a client 106 over the price of the product by extending counteroffers to one another until a final transaction price or settlement terms are reached. It should also be appreciated that the haggling system 114 may also generate user interface elements allowing a user to instruct the haggling engine to reject an offer or end the haggling process.

The haggling system 114 may further generate user interface elements allowing a user to negotiate or haggle with a plurality of users in parallel. In other words, a user may submit offers or counteroffers to multiple users in order to increase the efficiency of the haggling process. If a user engages in such parallel haggling, the haggling system 114 and haggling engine 141 may also ensure that an extended offer is not accepted by more offerees than the user desires. For example, if a buyer extends an offer to purchase an item at a given price to multiple sellers while only desiring to purchase one item, the haggling engine 141 can ensure that only a first of the sellers can accept the extended offer to ensure that the buyer does not consummate transactions with multiple users when such is contrary to the intent of the buyer.

The application server 111 also executes a user ratings system 115, which, in conjunction with the ratings engine 143, generates and displays haggling ratings associated with users 131 within the electronic commerce system 104. A haggling rating indicates the amenability, effectiveness, or efficiency of a user in the haggling process, and may be calculated based upon a number of components, including but not limited to, an average spread, a rounds score, and the volume of consummated transactions in the transaction history of a user, or a volume score. A haggling rating can further be based on a percentage of haggled transactions that are abandoned by a user, or an abandonment score. It should be appreciated that a haggling rating may also be based on other factors or values regarding a user that can be derived from the transaction history 132 or other data about a user.

It should be noted that the above noted data upon which a haggling rating is based can be stored or generated in various ways. As an alternative non-limiting example, a record of each haggled transaction can be stored within a data store, from which the above average spread, rounds score, volume and abandonment score can be extracted without such data being explicitly and separately stored.

Accordingly, the ratings engine 143 can calculate a haggling rating of a user by retrieving data within the transaction history 132 associated with a user. The average spread of a user is a score calculated by the ratings engine 143 that is based, for transactions that are consummated, on the average difference between an asking price and the final transaction price. In other words, the average spread expresses to what extent a user deviates from an initial asking price of a product, whether the user is a buyer or a seller. Accordingly, the ratings engine 143 can calculate the average spread by retrieving the spread 134 associated with each transaction within the transaction history 132 of a user and determining an average.

The ratings engine 143 calculates a rounds score, which is a score based upon an average number of counteroffers extended by a user during the haggling process in the transaction history 132 of the user. In other words, the rounds score represents the number of rounds of haggling a user typically engages in before consummating a transaction. Accordingly, the ratings engine 143 can calculate the rounds score by retrieving data regarding the number of rounds 135 of haggling associated with each transaction stored within the transaction history 132 of a user and determining an average. The ratings engine 143 also calculates a volume score based upon the number of transactions in the transaction history 132 of a user that have been consummated 136. In other words, the volume score is a score based upon the volume of transactions the user has consummated 136 in the electronic commerce system 104 as a result of haggling or negotiating with another user. Accordingly, the ratings engine 143 can calculate the volume score by retrieving data regarding transactions consummated 136 in the transaction history 132 of a user and determining a total.

The ratings engine 143 can also determine a percentage of transactions that are abandoned by a user by examining the abandoned flag 140 among transactions in a transaction history 132. A transaction can be deemed to have been abandoned if a user has engaged in the haggling process with another user and then failed to respond to an offer or counteroffer within a predetermined amount of time. Accordingly, an abandonment score can be assigned to a user based upon a percentage of abandoned transactions in the transaction history 132.

Upon calculation of the above noted average spread, rounds score volume score, abandonment score, or other value, the ratings engine 143 may determine the haggling rating for a user and display it via the user ratings system 115. The haggling rating of a user can be calculated in various ways, which can be dependent upon whether the user is a buyer or a seller in the electronic commerce system 104. For example, a haggling rating can be expressed as an average or weighted average of each of the average spread, rounds score, volume score, abandonment score, or other value. Alternatively, the calculation of a haggling rating can be varied depending on whether a user is a buyer or a seller in the electronic commerce system 104. Additionally, the haggling rating can be based on the average spread, rounds score, volume score, and abandonment score of a user who acts as a buyer and a seller within the system 104.

From the perspective of a seller, or in other words, to rate a buyer, an average spread of a buyer that is lower relative to the average spread of other buyers improves the haggling rating of the buyer. A rounds score of the buyer that represents fewer counteroffers extended by the buyer in a transaction history of the buyer relative to other buyers also improves the haggling rating of the buyer. A volume score of the buyer that represents a higher volume of transactions that the buyer has consummated in the transaction history of the buyer relative to other buyers also improves the haggling rating of the buyer. Additionally, an abandonment score representing a fewer number of abandoned transactions relative to other users of the system can improve the haggling rating of the buyer.

From the perspective of a buyer, or in other words, to rate a seller, an average spread of the seller that is higher relative to the average spread of other sellers improves the haggling rating of the seller. A rounds score of the seller that represents fewer counteroffers extended by the seller in the transaction history of the seller relative to other sellers also improves the haggling rating of the seller. A volume score of the seller that represents a higher volume of transactions that the seller has consummated in the transaction history of the seller relative to other sellers also improves the haggling rating of the seller. Additionally, an abandonment score representing a fewer number of abandoned transactions relative to other users of the system can improve the haggling rating of the seller.

Alternatively, each component of the haggling rating can be normalized so that all transactions for a user, regardless of whether the user has acted as a buyer or seller in the transaction, can be incorporated into the haggling rating. For example, a spread 134 associated with a transaction in the transaction history 132 can be normalized such that upon calculation of a normalized average spread, a single or universal calculation can be used to determine a haggling rating associated with the user. Additionally, a normalized spread can also act to improve the accuracy of a haggling rating, as a non-normalized spread may introduce inaccuracy or unfairness in a calculated haggling rating due to the price of a particular product. As a non-limiting example, each spread 134 in a transaction history 132 associated with a seller can be normalized according to the following exemplary formula:

$$\frac{(\text{Initial Asking Price} - \text{Settlement Price})}{\text{Initial Asking Price}} \quad \text{Equation 1}$$

Similarly, a spread 134 in a transaction history 132 associated with a buyer can be normalized as follows:

$$\frac{(\text{Settlement Price} - \text{Initial Offering Price})}{\text{Settlement Price}} \quad \text{Equation 2}$$

It should be appreciated that the above normalization can be accomplished in various ways using formulas and/or equations similar to or consistent with the above non-limiting examples. It should further be appreciated that any of the components of a haggling rating can be normalized similarly. It should also be appreciated that any of the above components of a haggling rating can be normalized over a predetermined period of time. For example, the ratings engine 143 may calculate an average spread associated with a user for transactions occurring in a time window extending a predetermined amount of time into the past.

The electronic commerce system 104 can determine a mean score for users of the system for each of the components of a haggling rating that are noted above. Accordingly, a score rating a user relative to other users in the system 104 can be determined by the number of standard deviations from the mean score of one of the components. Such a rating relative to other users can also be calculated using other statistical calculations that should be appreciated. Accordingly, a haggling rating can be calculated by determining an average or a weighted average of the score rating of each component of the haggling rating.

Additionally, a "star" or a shorthand rating can be assigned to a user based on the number of standard deviations from the mean of a haggling rating calculated from the above score ratings. As a non-limiting example, if a calculated haggling rating of a user is equivalent to a mean or average haggling rating among all users within the system, then the user can be assigned a rating of three on a scale spanning from one to five. Alternatively, a user having a calculated haggling rating that is one or two standard deviations above the mean can be assigned a rating of four or five, respectively. It should be appreciated that the above is but one example of generating a shorthand haggling rating and that other statistical calculations and measures can be employed to generate such a rating consistent with this disclosure.

The user ratings system 115 displays to a client a graphical or textual representation of a haggling rating of a user that is calculated by the ratings engine 143. A haggling rating can be displayed in a user interface 110 of a client 106 to a buyer or a seller to indicate the amenability, efficiency, or effectiveness of another buyer/seller to negotiate or haggle the sale of a product within the electronic commerce system 104. As one example, the haggling rating can be displayed as an integer rating or other number. As another non-limiting example, the haggling rating can be displayed as a rating on a predefined scale such as between zero and five, or, alternatively, zero and five stars, etc.

Reference is now made to FIG. 2, which shows a drawing of a user interface 110a according to an embodiment of the disclosure. More specifically, the depicted user interface 110a illustrates a product search results page generated in response to a search for products in the electronic commerce system 104. The depicted user interface 110a can be generated by the offer listing system 113 to display products sold in the electronic commerce system 104 to a buyer. Upon viewing this user interface 110a, the user may take steps to select a product to view an offer listing page.

In the exemplary product search results page, a product selection element 206 may indicate the condition of the products displayed in the user interface 110a. The products displayed may be offered at a fixed price from a variety of fixed price sellers. Products may also be offered in a used condition from fixed price sellers and displayed in the user interface 110a. A buyer in the electronic commerce system 104 may view offers for the product from various sellers and in varying product conditions at various prices by manipulating product name element 204 or product selection element 206. The user interface 110a of the depicted product search results page also includes an indicator 202 that indicates whether the price of a product may be haggled or negotiated with a seller in the electronic commerce system 104.

The depicted user interface 110a allows a user to select a product 204 returned in the search results by selecting user interface elements 204 or 206 in order to purchase the product, view more product details, or view an offer listing page, which sets forth various purchasing options.

Accordingly, reference is now made to FIG. 3, which illustrates a user interface 110b, which hereinafter be referred to as an offer listing page rendered to a buyer on the client 106 (FIG. 1). The offer listing page is generated by the offer listing system 113 by retrieving product listings from the server 103. A user may manipulate the user interface 110b of the offer listing page to cause the haggling system 114 to communicate with another buyer/seller in order to facilitate negotiation or haggling of the sales price or other terms of a product in the electronic commerce system 104.

The depicted offer listing page is displayed to a user upon selection of a product in the user interface 110a of FIG. 2. The offer listing page can communicate further product details to a buyer, including a product description 302 and at least one image 304 providing a picture of the product. The offer listing page may additionally include tabs allowing a user to manipulate the user interface 110b in order to filter the product offers displayed on the offer listing page by the condition of a product. For example, a user may view products that are in a new condition by selecting filtering tab 306 of the depicted user interface 110b. Alternatively, a user may view products that are in a used condition by selecting filtering tab 308. A user may also view products in any condition by selecting filtering tab 310. The offer listing page also indicates to a buyer various attributes of a product offer from a seller, which can include the initial asking price 312 and condition 314 of the product.

Various product offers from various sellers are shown in the offer listing page. The product offers are extended from sellers 316 at an initial asking price 312 and display the condition of the product. A product offer identifies the seller 316 and includes a purchasing element 317. A user may manipulate the purchasing element 317 to purchase the item in a fixed price transaction. At least one offer displayed in the exemplary offer listing page of FIG. 3 further includes a haggling element 318, which allows a user to manipulate the user interface 110b in order to haggle or negotiate with the seller regarding the settlement terms of a purchase of the product. Accordingly, a user may manipulate the user interface 110b to cause the haggling system 114 to transmit an offer or counteroffer to the user. In addition, the offer listing page also includes haggling checkbox 319, which is a user interface element that allows a user to haggle with multiple sellers shown within the user interface. Haggling checkbox 319, in conjunction with selected haggling element 320 and global haggling element 321, allow a user to haggle with selected or all sellers shown on the offer listing page.

Additionally, price research element 322 can allow a user of the system to view various historical prices and other metrics in order to determine the competitiveness or reasonableness of a price offered by another user. Accordingly, a user can manipulate drop down boxes 323 to cause the price research element 322 to be updated to reflect the desired information. For example, the drop down boxes 323 can allow a user to view historical asking prices, prices offered in the haggling process, settlement prices, retail prices and other data that should be appreciated to assist a user in determining whether he or she wishes to purchase or make an offer to purchase a product viewed within the user interface.

Also shown is a haggling rating 324a generated by the ratings system 115. The haggling rating 324a is displayed in connection with sellers willing to negotiate or haggle the sales prices of a product within the electronic commerce system 104. As noted above, the haggling rating 324a indicates the amenability, efficiency or effectiveness of the seller in haggling or negotiating the sales price or other terms of a product. As depicted, the haggling rating 324a is shown as a star rating that may vary between zero and five stars, but it should be appreciated that the haggling rating 324a may be expressed to a user in a variety of ways, which can include but are not limited to an integer rating, a numerical rating, a color, letter grade, or any other way of communicating a rating or grade that should be appreciated.

As an alternative to displaying a haggling rating generated by the user ratings system 115, the system can display each of the components of a haggling rating separately. As a non-limiting example, the ratings engine 143 can generate an average spread, a rounds score, a volume score, an abandonment score, or other value and assign a rating on a common scale for each component. Each rating can be based on the value of each score relative to other users of the system 104.

Figure 4:
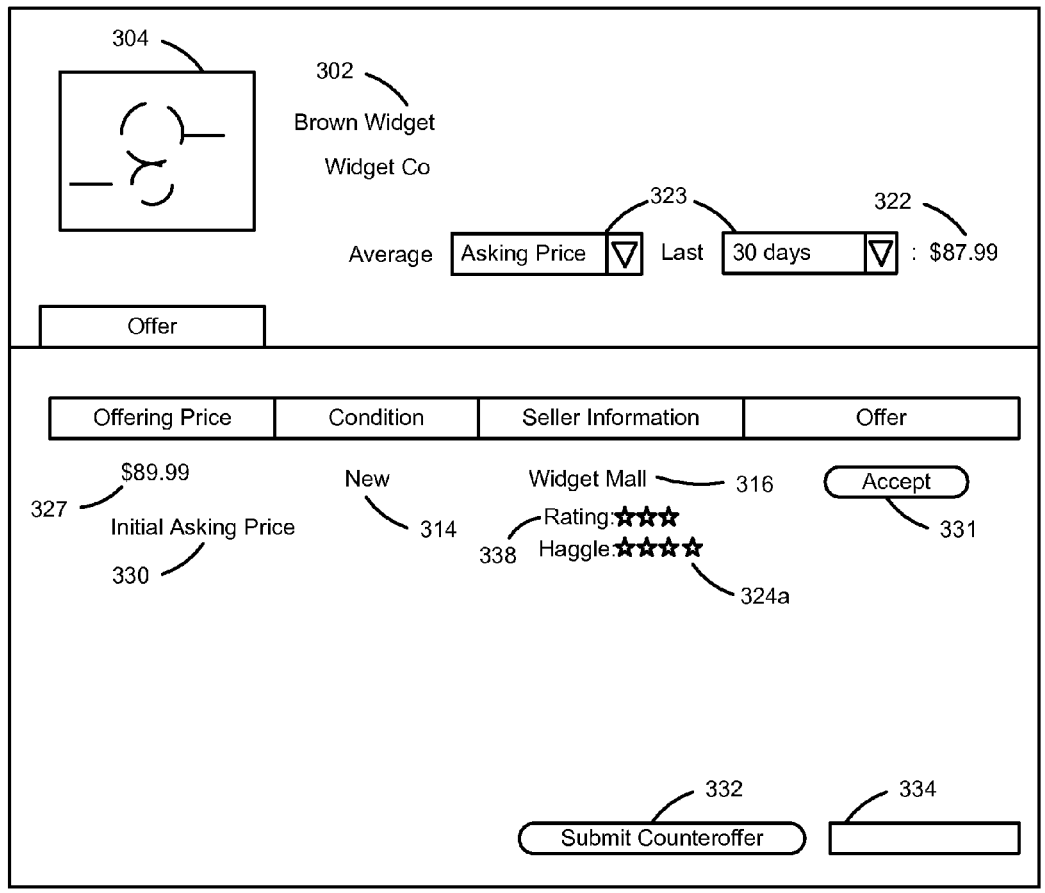
FIG. 4 is a drawing of an example of a user interface that shows a haggling screen for the product desired by the user shown in the user interface of FIG. 2 according to an embodiment of the present disclosure.

Should a user desire to haggle or negotiate the sales price of an item from a seller from an offer listing page, the user may manipulate the user interface 110b to cause the haggling system 114 to generate a haggling screen, as is illustrated in the drawing of a user interface 110ca of FIG. 4.

Accordingly, FIG. 4 illustrates one example of a user interface 110ca that is hereinafter referred to as a haggling screen. The depicted haggling screen illustrates user interface elements facilitating the haggling process within the electronic commerce system 104 from the point of view of a buyer that has chosen to haggle with a seller of a product. The haggling screen depicts product details 302 as well as a product image 304. In addition, the user interface 110ca also displays an offering price 327, which represents the price offered by a seller for a product in the electronic commerce system 104.

The offering price 327 indicates the present outstanding offer extended by a seller to a buyer in the electronic commerce system 104, and it may represent an initial asking price or a counteroffer that is extended later in the haggling process. Haggling stage indicator 330 indicates to a buyer the stage of the haggling process. In other words, the haggling stage indicator 330 indicates to a buyer or seller the type of offer displayed in a haggling screen. For example, the haggling stage indicator can indicate that an offer is an initial asking price, a counteroffer, a final offer, or another stage of the haggling process that should be appreciated.

The haggling rating 324a of the seller is also shown, and is generated by the user ratings system 115 as noted above. A buyer may accept a product offer at the offering price 327 by manipulating the accept user interface element 331 and purchasing the product. Alternatively, a user may reject the offering price 327 and submit a counteroffer to the seller by manipulating the counteroffer user interface element 332 and entering a counteroffer price in the counteroffer field 334. Upon entry and submission of the counteroffer in the counteroffer field 334, the counteroffer is transmitted to the other party. A counteroffer can be transmitted to the other party by electronic mail, SMS, or other notification that should be appreciated. As noted above in reference to the haggling engine 141, the ability of a user to accept an offer can be removed if an offeror is haggling with multiple offerees in parallel. In this case, a first offeree that accepts an offer will eliminate the ability of other offerees to accept the same offer extended from the offeror. It should be appreciated that various additional user interface elements can be incorporated in the depicted haggling screen that may provide additionally ancillary functionality for the user interface 110a. For example, user interface elements providing the ability of a user to filter the product offers by the haggling rating of the seller, by price, or by other criteria or attributes of the product offer can also be incorporated.

Figure 3:
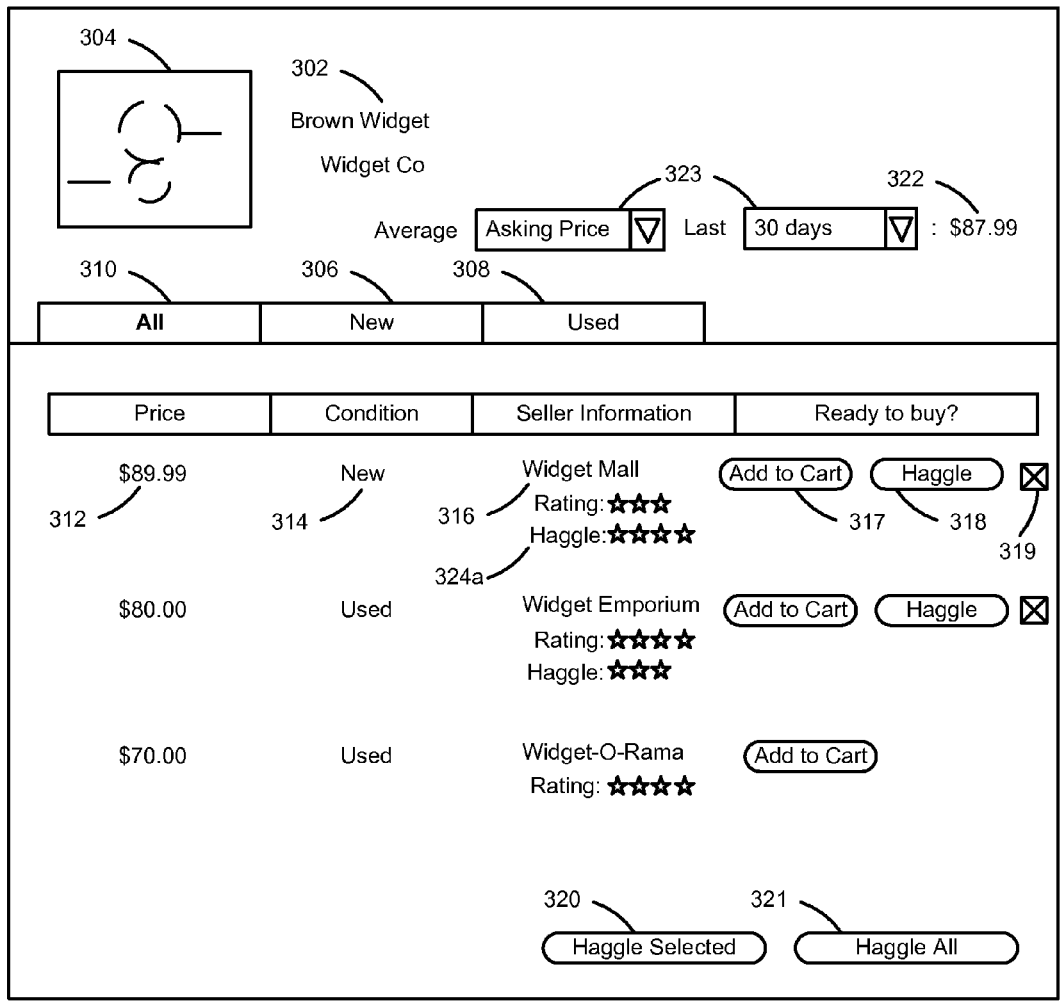
FIG. 3 is a drawing of an example of a user interface that shows an offer listing page for a product desired by a user from among the products displayed to the user in the user interface of FIG. 2 according to an embodiment of the present disclosure.

As noted above in reference to the graphical user interface of FIG. 3, a user may wish to negotiate or haggle with multiple sellers offering a product from the offer listing page.

Figure 5:
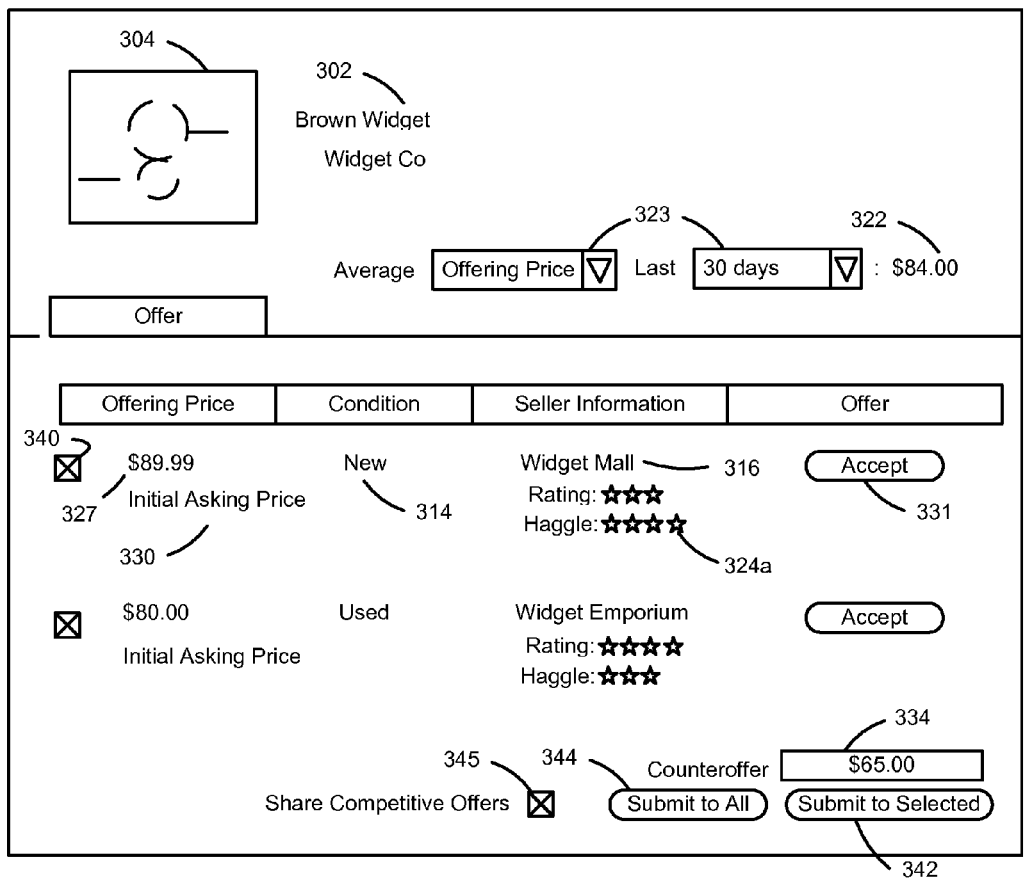
FIG. 5 is a drawing of an alternative example of a user interface that shows a haggling screen for the product desired by the user shown in the user interface of FIG. 2 according to an embodiment of the present disclosure.

Accordingly, FIG. 5 illustrates one example of a user interface 110cb providing the ability to haggle with multiple users in parallel. The depicted alternative haggling screen of FIG. 5, similar to the graphical user interface of FIG. 4, provides product information 302 and product images 304 for viewing by the user. In addition, the alternative haggling screen provides information about the offers extended to the user, including the offering price 327, and a haggling status indicator 330 which informs the user as to the stage of the haggling or negotiation process. The alternative haggling screen also indicates to the user the condition of the product through a condition indicator 314 as well as information about the seller 316, including a haggling rating 324a generated by the user ratings system 115 and ratings engine 143.

Also depicted is a parallel haggling checkbox 340 that allows a user to select one or more sellers to which an offer or counteroffer is transmitted. A user may enter such a counteroffer by entering a counteroffer price in the counteroffer field 334. A counteroffer can be transmitted by a buyer to a seller(s) selected using parallel haggling checkbox 340 by manipulating the selected seller submission element 342. Alternatively, a user may submit a counteroffer to all displayed sellers by manipulating global seller submission element 344 of the user interface 110cb. A product offer may also be accepted by manipulating the accept element 331.

Additionally, offer sharing element 345 is depicted, which allows a user to share with one or more sellers other offers the user has received for the same product. This may allow one user to exert negotiating leverage on another user, which may assist the user in obtaining more competitive pricing whether the user is a buyer or a seller. For example, it should be appreciated that causing sellers in a haggling transaction to compete with one another to complete a sale can result in better pricing for a buyer. Accordingly, when submitting an offer to purchase a product, a user may concurrently choose to share one or more offers extended by other sellers in order to exert such negotiating leverage. Alternatively, a user may manipulate offer sharing element 345 and submission elements 342 or 344 without entering a counteroffer price in the counteroffer field 334 in order to share such information with sellers without submitting a concurrent counteroffer.

Figure 6:
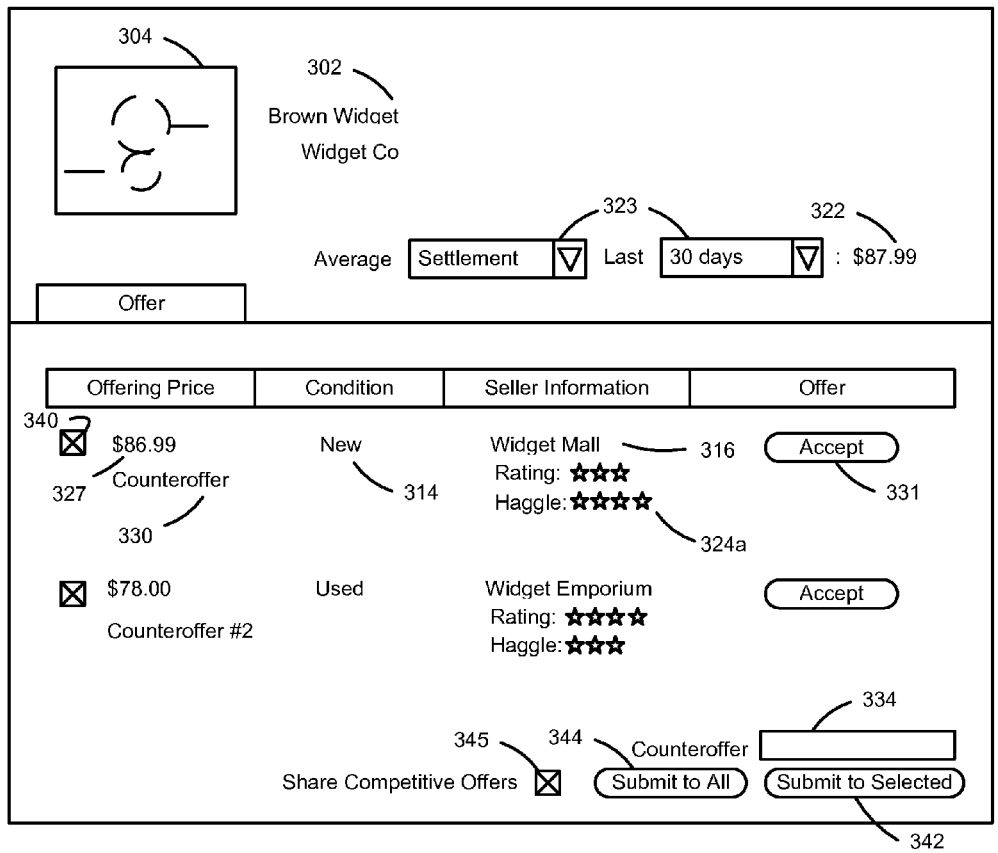
FIG. 6 is a drawing of an alternative example of a user interface that shows a haggling screen for the product desired by the user shown in the user interface of FIG. 2 according to an embodiment of the present disclosure.

Reference is now made to FIG. 6, which depicts a user interface 110cc, which illustrates an additional example of an alternative haggling screen. FIG. 6 illustrates an example of a haggling screen with a haggling status indicator 330 showing additional information about the status of the haggling process. The haggling status indicator 330 may indicate that a seller 316 has submitted a first counteroffer in response to a previously submitted offer by the user. Alternatively, the haggling status indicator 330 may indicate that a respective seller has submitted a second counteroffer in response to a previously submitted offer by the user. It should be appreciated that the haggling status indicator 330 can include any information relevant to the status of the haggling process, whether such information is a counteroffer, an initial offer, a final offer, or any other type of offer that should be appreciated.

Figure 7:
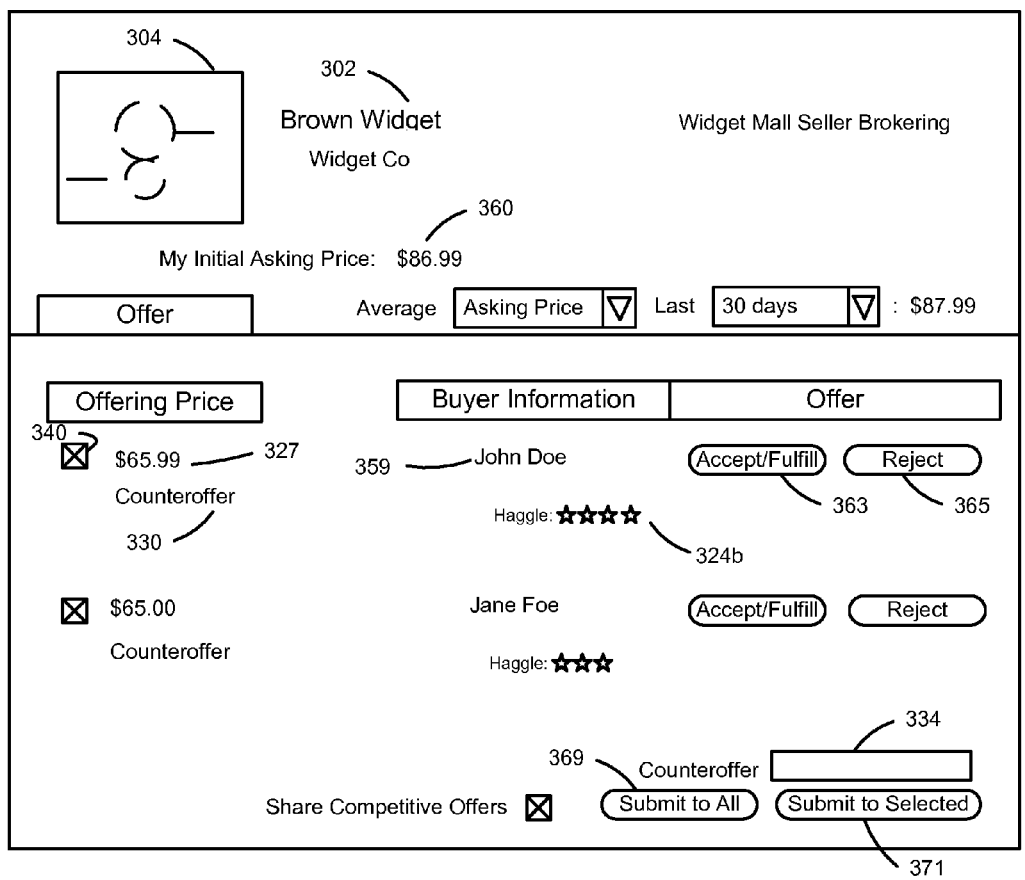
FIG. 7 is a drawing of an example of a user interface that shows a haggling screen for a seller of the product desired by the user shown in the user interface of FIG. 2 according to an embodiment of the present disclosure.

Reference is now made to FIG. 7, which depicts user interface 110d, which illustrates additional example of a haggling screen rendered for a seller. The depicted user interface 110d illustrates a haggling screen from the point of view of a seller in the electronic commerce system 104. The haggling screen communicates with the haggling system 114 and the haggling engine 141 to facilitate the haggling process in the electronic commerce system 104. The depicted user interface 110d allows a seller to respond to offers to purchase a product that are extended by buyers in the haggling process. The user interface 110d includes information regarding a buyer 359 extending an offer to purchase a product. Additionally, the user interface 110d further includes a buyer haggling rating 324b, which is displayed to indicate to a seller the amenability or effectiveness of a buyer in haggling or negotiating within the electronic commerce system 104. Also depicted is an initial asking price indicator 360 which indicates to a seller its initial asking price for the item for which buyer offers are being presented.

A seller may accept or reject offers extended by manipulating the accept element 363 and/or reject element 365 buttons, respectively. By manipulating the user interface 110*d* and activating the reject element 365, a seller may end the haggling process with a buyer. Alternatively, a seller may transmit a counteroffer to one or more sellers by entering a counteroffer in the counteroffer field 334. A user may either submit a counteroffer to all of the displayed buyers by manipulating the global buyer submission element 369, or a seller may selectively transmit a counteroffer by manipulating the parallel haggling checkbox 340 and the selected buyer submission element 371.

Figure 8:
FIG. 8 is a drawing of an example of a user interface that shows a haggling administration screen for a seller of products in the electronic commerce system according to an embodiment of the present disclosure.

Reference is now made to FIG. 8, which depicts user interface 110*e*, which illustrates an example of a haggling administration screen rendered for a seller. The depicted user interface 110*e*, or haggling administration screen, communicates with the haggling system 114 and the haggling engine 141 to facilitate the haggling process in the electronic commerce system 104. The depicted user interface 110*e* allows a seller to view a summary of transactions which are presently in the haggling process. In other words, the user interface 110*e* allows a seller to view products for which the haggling process has been initiated by a user in the electronic commerce system 104.

Accordingly, the haggling administration screen displays products presently in the haggling process, which are indicated by product indicator 380. For each product that the user interface 110*e* indicates is in the haggling process, pending offers indicator 382 indicates the number of pending offers that exist for the product. A seller or administrator may manipulate the pending offers indicator 382 to view haggling screens consistent with FIG. 7, for example, that are associated with the product, where the seller may engage in the haggling process with potential buyers. Asking price indicator 384 provides the seller with the current asking price that the seller has set for a particular product. Average offer price indicator 386 indicates the average offering price extended by potential buyers in the haggling process so that a seller may view an approximation of market conditions as it relates to potential haggled transactions. Stock indicator 388 indicates the quantity of products remaining in the stock associated with the seller, so a seller may view an additional approximation of market conditions as it relates to the inventory of the seller.

Figure 9:
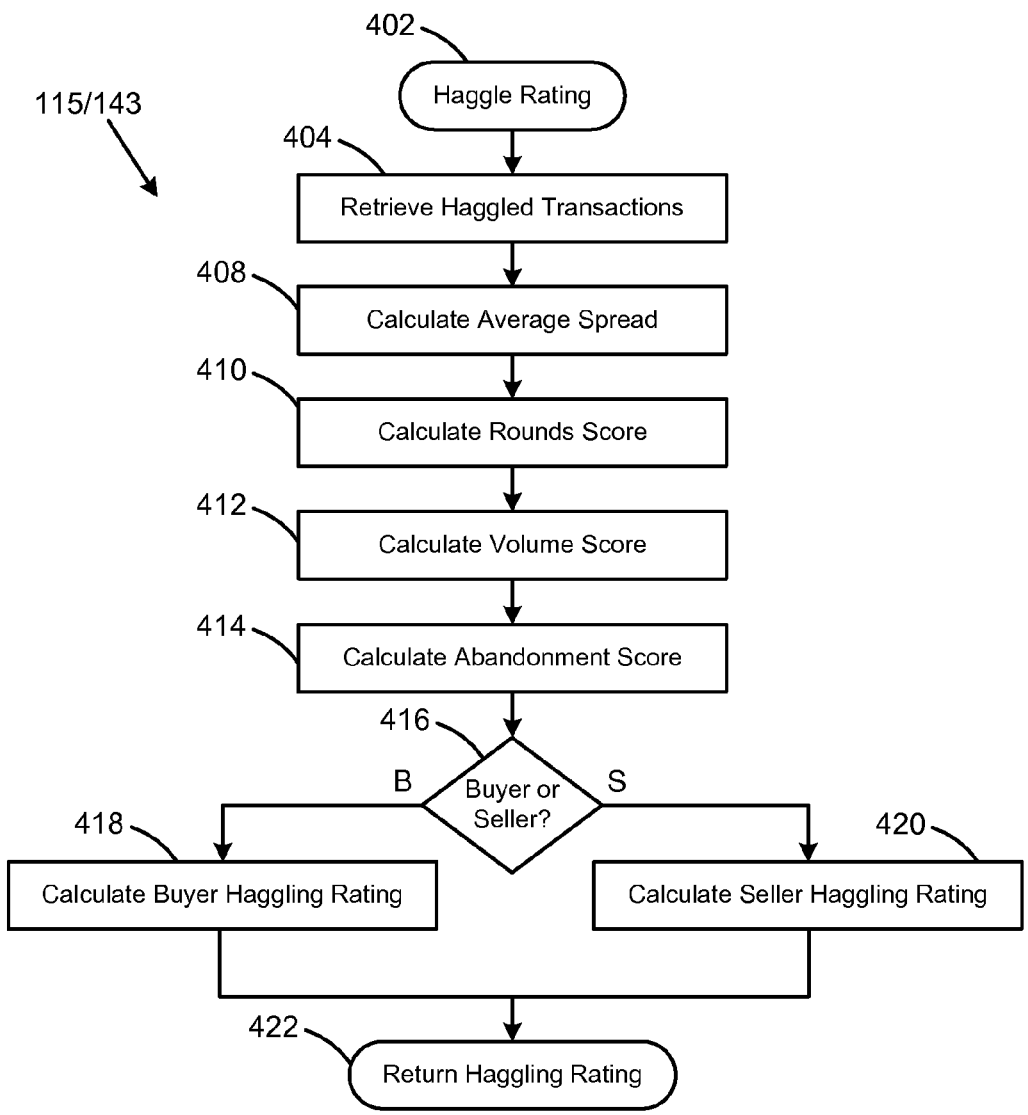
FIG. 9 is a flow chart that provides one example of the operation of a calculation of a haggling rating according to an embodiment of the present disclosure.

With reference to FIG. 9, shown is one example of execution of the user ratings system 115 and ratings engine 143. Alternatively, the flow chart of FIG. 8 can be implemented as a method. First, in box 404, transactions for which a user has haggled or negotiated are retrieved from the transaction history 132 associated with the user. Then, in box 408 an average spread is calculated. In box 410, a rounds score is calculated for the retrieved transactions, and in box 412 the volume score is calculated which corresponds to the volume of haggled transactions in the transaction history 132 of the user. In box 414, an abandonment score corresponding to the percentage of abandoned haggled transactions the user has engaged in is also calculated.

Upon calculation of an average spread, a rounds score, a volume score, and an abandonment score, in box 416 it is then determined whether the haggling rating corresponds to a buyer or a seller. If the haggling rating corresponds to a buyer, then in box 418 a buyer haggling rating is calculated. If the haggling rating corresponds to a seller, then in box 420 a seller haggling rating is calculated. Thereafter, in box 422, the haggling rating is returned to the initiating process.

Figure 10:
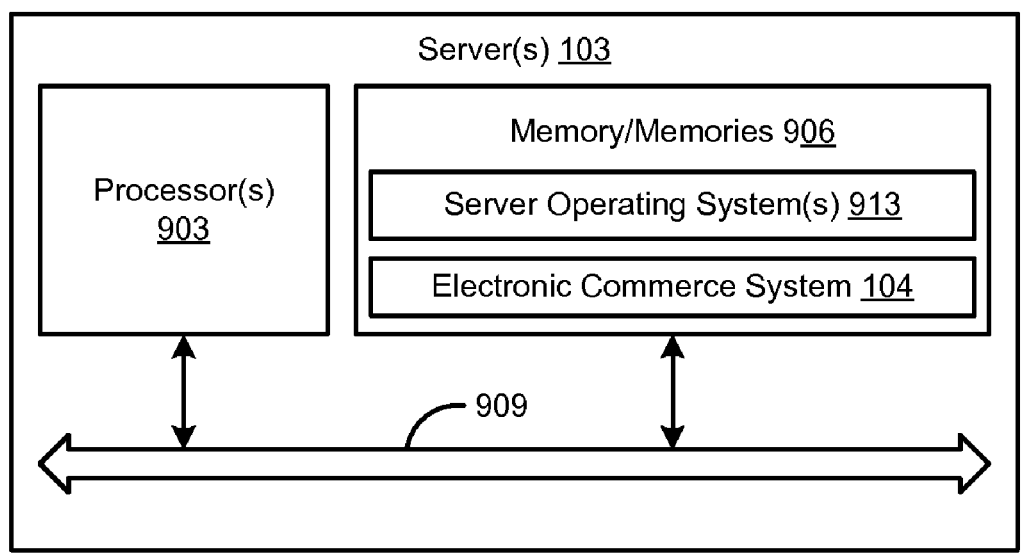
FIG. 10 is a block diagram of one example embodiment of a server in the network of FIG. 1 according to an embodiment of the present disclosure.

With reference to FIG. 10, shown is one example of a server 103 that comprises a computer server or equivalent device according to an embodiment of the present disclosure. The server 103 may include one or more processor circuits having a processor 903 and a memory 906, both of which are coupled to a local interface 909. In this respect, the local interface 909 may comprise, for example, a data bus with an accompanying control/address bus as can be appreciated.

Stored on the memory 906 and executable by the processor 903 are various components such as a server operating system 913 and the electronic commerce system 104. Also, such components may reside in a memory that is external from the server 103 as can be appreciated.

As set forth above, a number of components are stored in the memory 906 and are executable by the processor 903. In this respect, the term "executable" refers to a program file that is in a form that can ultimately be run by the processor 903. Examples of executable programs may be, for example, a compiled program that can be translated into machine code in a format that can be loaded into a random access portion of the memory 906 and run by the processor 903, or source code that may be expressed in proper format such as object code that is capable of being loaded into a random access portion of the memory 906 and executed by the processor 903. An executable program may be stored in any portion or component of the memory 906 including, for example, random access memory, read-only memory, a hard drive, compact disk (CD), floppy disk, or other memory components.

The memory 906 is defined herein as both volatile and nonvolatile memory and data storage components. Volatile components are those that do not retain data values upon loss of power. Nonvolatile components are those that retain data upon a loss of power. Thus, the memory 906 may comprise, for example, random access memory (RAM), read-only memory (ROM), hard disk drives, floppy disks accessed via an associated floppy disk drive, compact discs accessed via a compact disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

In addition, the processor 903 may represent multiple processors and the memory 906 may represent multiple memories that operate in parallel. In such a case, the local interface 909 may be an appropriate network that facilitates communication between any two of the multiple processors, between any processor and any one of the memories, or between any two of the memories, etc. The processor 903 may be of electrical, optical, or of some other construction as can be appreciated by those with ordinary skill in the art.

The server operating system 913 is executed to control the allocation and usage of hardware resources such as the memory and processing time in the server 103. In this manner, the server operating system 913 serves as the foundation on which applications depend as is generally known by those with ordinary skill in the art.

The flow chart of FIG. 9 shows the functionality and operation of an implementation of the server 103 executing a transaction that is haggled or negotiated. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor in a computer system or other system. The machine code may be converted from the source code, etc. If embodied in hardware, each block may represent a circuit or a number of interconnected circuits to implement the specified logical function(s).

Although the flow chart of FIG. 9 shows a specific order of execution, it is understood that the order of execution may differ from that which is depicted. For example, the order of execution of two or more blocks may be scrambled relative to the order shown. Also, two or more blocks shown in succession in FIG. 9 may be executed concurrently or with partial concurrence. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, where the functionality of the disclosed systems are expressed in the form of software or code, it can be embodied in any computer-readable medium for use by or in connection with an instruction execution system such as, for example, a processor in a computer system or other system. In this sense, the functionality may comprise, for example, statements including instructions and declarations that can be fetched from the computer-readable medium and executed by the instruction execution system. In the context of the present disclosure, a "computer-readable medium" can be any medium that can contain, store, or maintain the network page for use by or in connection with the instruction execution system. The computer readable medium can comprise any one of many physical media such as, for example, electronic, magnetic, optical, or semiconductor media. More specific examples of a suitable computer-readable medium would include, but are not limited to, magnetic tapes, magnetic floppy diskettes, magnetic hard drives, or compact discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Although the functionality of various embodiments are described above with respect to FIGS. 1-9 as being embodied in software or code executed by general purpose hardware as discussed above, as an alternative the same may also be embodied in dedicated hardware or a combination of software/general purpose hardware and dedicated hardware. If embodied in dedicated hardware, the functionality of these components can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, programmable gate arrays (PGA), field programmable gate arrays (FPGA), or other components, etc. Such technologies are generally well known by those skilled in the art and, consequently, are not described in detail herein.

It should be emphasized that the above-described embodiments of the present disclosure are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure and the present disclosure and protected by the following claims.

Therefore, having thus described the invention, at least the following is claimed:

1. A method for rating a user, comprising the steps of:
calculating in a processor based system an average spread of the user, wherein the average spread comprises an average difference between an initial list price and a final transaction price among transactions in a transaction history of the user;
calculating in a processor based system a rounds score, wherein the rounds score is based on a number of counteroffers extended by the user among transactions in the transaction history;
calculating in a processor based system a volume score, wherein the volume score is based on a volume of transactions the user has consummated in the transaction history;
calculating in a processor based system an abandonment score, wherein the abandonment score is based on a percentage of transactions the user has abandoned in the transaction history;
calculating in a processor based system a haggling rating, wherein the haggling rating is based on a combination of the average spread, the rounds score, the volume score, and the abandonment score, and represents an effectiveness of the user in haggling and completing transactions with other users;
encoding for display at least one product;
encoding for display a product indicator for each of the at least one product; the product indicator denoting whether the price of the at least one product can be haggled;
upon selection of one of the at least one product, encoding for display at least one seller willing to sell the product, an initial asking price associated with the at least one seller, and a seller indicator associated with the at least one seller representing whether the at least one seller is willing to negotiate a sales price differing from the initial asking price; and
encoding for display the haggling rating associated with the at least one seller.

2. A method for rating a user, comprising the steps of:
calculating in a processor based system an average spread of the user, wherein the average spread comprises an average difference between an initial list price and a final transaction price among transactions in a transaction history of the user;
calculating in a processor based system a rounds score, wherein the rounds score is based on the number of counteroffers extended by the user among transactions in the transaction history; and
calculating in a processor based system a haggling rating, wherein the haggling rating is based on a combination of the average spread and the rounds score, and represents an effectiveness of the user in haggling and the completing transactions with other users.

3. The method of claim 2, further comprising the steps of:
calculating in the processor based system a volume score, wherein the volume score is based on a volume of transactions the user has consummated in the transaction history; and
calculating in a processor based system an abandonment score, wherein the abandonment score is based on a percentage of transactions the user has abandoned in the transaction history; wherein
the haggling rating is further based on the volume score and the abandonment score.

4. The method of claim 2, wherein the haggling rating further comprises an integer.

5. The method of claim 2, wherein the haggling rating is assigned on a scoring scale, the scoring scale ranging from zero to five.

6. The method of claim 3, wherein the step of calculating the haggling rating further comprises the steps of:
calculating in the processor based system a seller haggling rating; wherein,
a seller average spread that is higher relative to an average spread of other sellers improves the seller haggling rating;
a seller rounds score that represents fewer counteroffers extended by a seller in the transaction history relative to other sellers improves the seller haggling rating;
a seller volume score that represents a higher volume of transactions the seller has consummated in the transaction history relative to other sellers improves the seller haggling rating; and
a seller abandonment score that represents a lower percentage of abandoned transactions relative to other sellers improves the seller haggling rating.

7. The method of claim 3, wherein the step of calculating the haggling rating further comprises:
calculating in the processor based system a buyer haggling rating; wherein,
a buyer average spread that is lower relative to an average spread of other buyers improves the buyer haggling rating;
a buyer rounds score that represents fewer counteroffers extended by a buyer in a transaction history relative to other buyers improves the buyer haggling rating;
a buyer volume score that represents a higher volume of transactions the buyer has consummated in the transaction history relative to other buyers improves the buyer haggling rating; and
a buyer abandonment score that represents a lower percentage of abandoned transactions relative to other sellers improves the buyer haggling rating.

8. The method of claim 7, further comprising the step of encoding for display a haggling rating associated with at least one seller indicating the effectiveness of the at least one seller in haggling a sales price differing from an initial asking price, the haggling rating indicating the effectiveness of the at least one seller relative to other sellers.

9. The method of claim 8, wherein the haggling rating is encoded for display as a rating on a scale from zero to five stars.

10. The method of claim 8, further comprising the step of filtering the at least one seller according to the haggling rating of the seller.

11. The method of claim 7, further comprising the steps of:
upon selection of a seller depicted in a user interface, encoding for display a first offer form allowing a counteroffer to be submitted; and
broadcasting the counteroffer to the seller.

12. The method of claim 7, further comprising the steps of:
upon selection of a plurality of sellers from a user interface, encoding for display a second offer form allowing a counteroffer to be submitted; and
broadcasting the counteroffer to the plurality of sellers.

13. The method of claim 7, further comprising the steps of:
encoding for display at least one offer, wherein the at least one offer includes an offered price, an identity of an offeror, and a haggling rating of the offeror, the haggling rating indicating the effectiveness of the offeror to negotiate a sales price differing from an initial asking price;
encoding for display a first user interface element allowing the user to accept or reject the at least one offer; and
encoding for display a second user interface element allowing the user to submit a counteroffer corresponding to the at least one offer.

14. The method of claim 13, wherein the second user interface element allows the user to broadcast the counteroffer corresponding to a plurality of offers.

15. The method of claim 13, further comprising the step of filtering the at least one offer according to the haggling rating of the offeror.

16. The method of claim 13, further comprising the step of filtering the at least one offer according to the offered price.

* * * * *